United States Patent [19]
Carter et al.

[11] Patent Number: 5,584,660
[45] Date of Patent: Dec. 17, 1996

[54] INCREASED IMPACT RESISTANCE IN HOLLOW AIRFOILS

[75] Inventors: David B. Carter, Manchester; Michael A. Weisse, Tolland, both of Conn.

[73] Assignee: United Technologies Corporation, Hartford, Conn.

[21] Appl. No.: 430,948

[22] Filed: Apr. 28, 1995

[51] Int. Cl.$^6$ .................................................. F01D 5/18
[52] U.S. Cl. ................................. 416/233; 416/DIG. 2; 29/889.72
[58] Field of Search .................................. 416/232, 233, 416/DIG. 2; 29/889.72

[56] References Cited

U.S. PATENT DOCUMENTS

| | | | |
|---|---|---|---|
| 4,815,939 | 3/1989 | Doble | 416/233 |
| 5,253,824 | 10/1993 | Halila et al. | 416/233 |
| 5,269,058 | 12/1993 | Wiggs et al. | 416/233 |
| 5,419,040 | 5/1995 | Weisse et al. | 29/889.72 |
| 5,439,354 | 8/1995 | Hansen et al. | 416/233 |

*Primary Examiner*—Edward K. Look
*Assistant Examiner*—James A. Larson
*Attorney, Agent, or Firm*—Marina F. Cunningham

[57] ABSTRACT

A hollow airfoil (10) for a gas turbine engine having a leading edge (12), a trailing edge (14), a pressure side (20), and a suction side (22) includes a plurality of internal spanwise stiffening ribs (31–35) that are arranged in a logarithmic pattern. The particular arrangement of internal fibs (31–35) optimizes stiffness of the airfoil (10) without significantly increasing the weight thereof.

15 Claims, 4 Drawing Sheets

INCREASED IMPACT RESISTANCE IN HOLLOW AIRFOILS

TECHNICAL FIELD

The present invention relates to gas turbine engines and, more particularly, to manufacture of gas turbine engine hollow airfoils having internal ribs.

BACKGROUND OF THE INVENTION

One critical concern in the fabrication of gas turbine engines is the overall weight of the engine. Excessive weight in the components of the gas turbine engine limits the useful load and reduces the flight range capability (fuel weight) of the aircraft. Thus, it is a goal of the gas turbine engine industry to minimize the overall weight of the gas turbine engine without sacrificing the performance or durability thereof.

It is this effort to minimize the overall weight of the gas turbine engine that has led the industry to the use of hollow fan blades. Each hollow fan blade typically includes a leading edge and a trailing edge extending radially spanwise from a bottom portion to a top portion of the blade. A suction side and a pressure side extend chordwise from the leading edge to the trailing edge. A plurality of hollow cavities is defined within the airfoil between the internal stiffening ribs.

One problem that afflicts the fan blade in general and the hollow blade in particular is foreign object damage. Foreign objects, such as birds and ice in flight and rocks and sand on the ground, are generally ingested with the incoming air into the gas turbine engine. The ingested foreign objects strike the fan blades at high velocities, causing damage from the impact. The impact critical zone on the fan blade is on the leading edge of the blade approximately from sixty percent (60%) to one hundred percent (100%) of the radial span of the blade and up to sixty percent (60%) of the chordwise span.

The damage caused by the impact from the foreign objects may lead to airfoil cracking or in extreme instances to complete engine failure. The hollow airfoils are particularly susceptible to cracks because of the stiffness discontinuity that is inherent in hollow airfoils. The stiffness discontinuity occurs in the transition areas between the stiff solid leading edge and the softer hollow sections of the airfoil. The cracking tends to occur primarily in the areas of greatest stiffness discontinuity.

The current approach for reducing damage in hollow airfoils is to increase the stiffness in the hollow sections of the airfoil. The stiffening of hollow sections is currently achieved by either thickening the side walls between the ribs, thickening the internal ribs, reducing the spacing between the internal ribs, or any combination thereof. However, the above methods of increasing the stiffness of the hollow sections involve a penalty of significantly increasing the weight of each blade. Thus, there is still a need for an optimum balance between the increased impact resistance and the minimized weight of the gas turbine engine hollow fan blades.

SUMMARY OF THE INVENTION

It is an object of the present invention to improve impact resistance of hollow airfoils without significantly increasing the weight thereof.

It is a further object of the present invention to provide optimum spacing between the internal ribs of hollow airfoils.

According to the present invention, a hollow airfoil includes a plurality of internal radially spanwise stiffening ribs arranged in a logarithmic pattern to reduce the stiffness discontinuity therein. Each airfoil comprises a leading edge and a trailing edge extending radially spanwise from a bottom portion to a top portion of the airfoil. A suction side and a pressure side extend chordwise from the leading edge to the trailing edge. The leading edge includes a leading edge solidity, defined as a zero rib. Subsequent ribs succeeding the leading edge solidity are arranged in a logarithmic pattern adhering to a relationship formulated as:

$$D = A\, e^{xt}$$

wherein $t=0, 1, 2, 3$ etc. and represents a sequential number of each stiffening rib with the leading solidity being defined as the zero rib; $A$ and $x$ are empirically derived coefficients; $e$ is a natural logarithmic function; and $D$ is the distance from the leading edge to the $t^{th}$ rib.

The logarithmic arrangement of the internal spanwise stiffening ribs of the present invention improves impact resistance of the hollow airfoils by minimizing the stiffness discontinuity that is inherent to hollow airfoils. The stiffness discontinuity is minimized because the logarithmic arrangement provides a gradual transition in stiffness between the solid leading edge solidity and the hollow sections of the airfoil. Impact resistance is improved without adversely affecting the overall weight of the gas turbine engine.

The foregoing and other objects and advantages of the present invention become more apparent in light of the following detailed description of the exemplary embodiment thereof, as illustrated in the accompanying drawings.

BEST MODE FOR CARRYING OUT THE INVENTION

Figure 1:
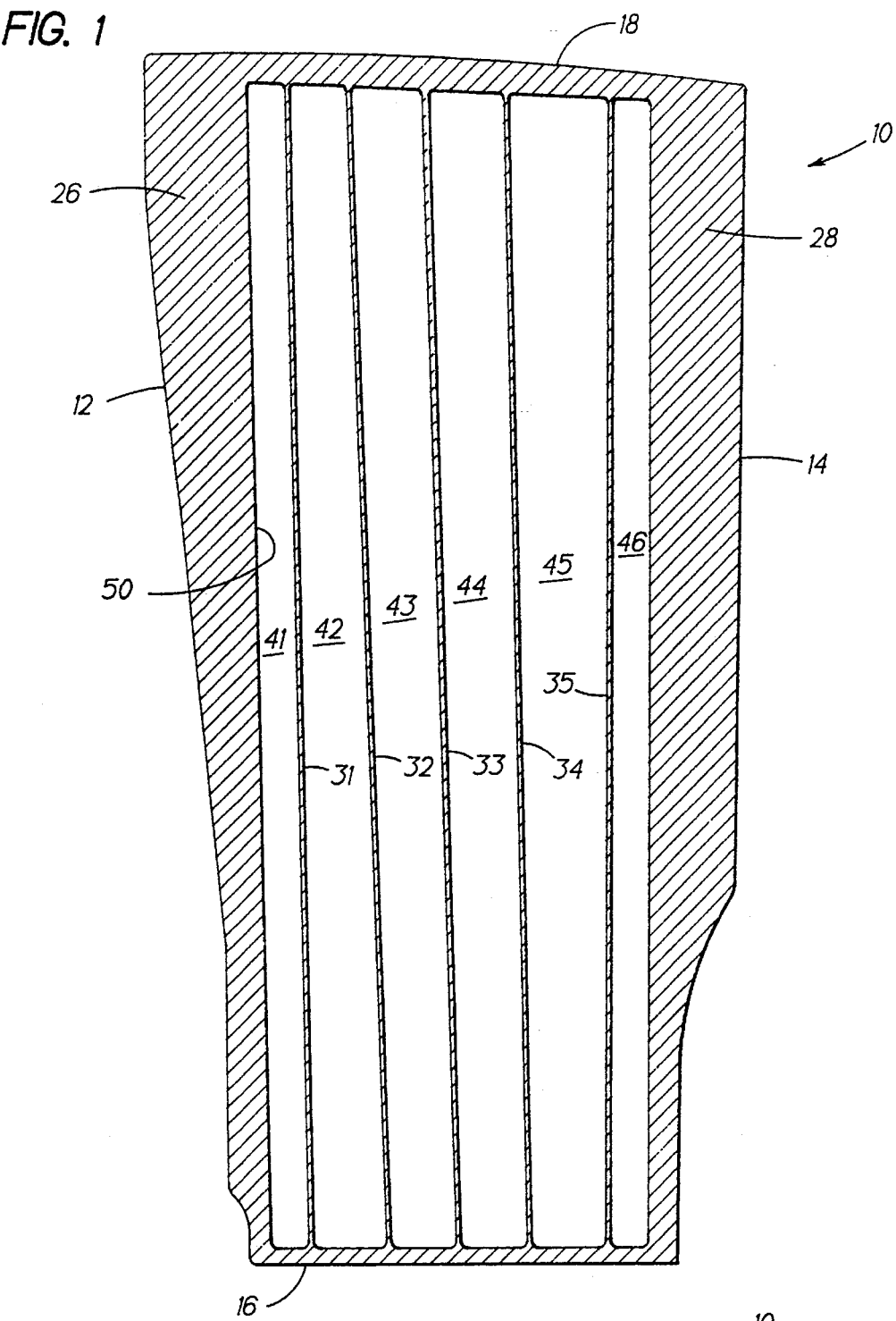
FIG. 1 is a section of one half a blade with internal spanwise stiffening ribs arranged in a logarithmic pattern, according to the present invention.
Figure 2:
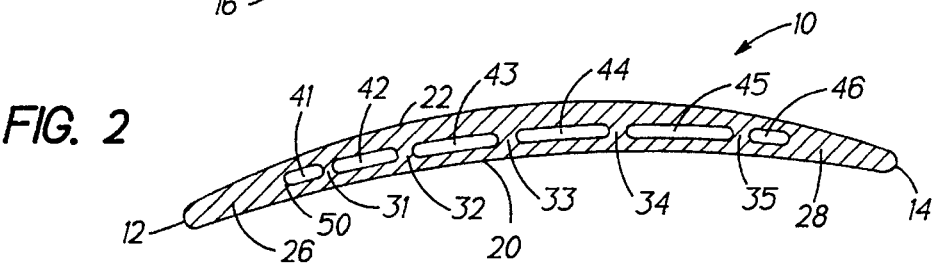
FIG. 2 is a section showing a final blade of FIG. 1.

Referring to FIG. 1, an airfoil 10 includes a leading edge 12 and a trailing edge 14 extending radially spanwise from a bottom portion 16 to a top portion 18. A pressure side 20 and a suction side 22, shown in FIG. 2, extend chordwise from the leading edge 12 to the trailing edge 14. A leading edge solidity 26 is formed at the leading edge 12. A trailing edge solidity 28 is formed at the trailing edge 14. Internal radially spanwise stiffening ribs 31–35 extend radially spanwise from the bottom portion 16 to the top portion 18. Each spanwise rib 31–35 joins the pressure side 20 and the suction side 22 of the airfoil 10. Cavities 41–46 are defined between the ribs 31–35.

The spanwise stiffening ribs 31–35 are arranged in a logarithmic pattern expressed as:

$$D = A e^{xt}$$

wherein t=0, 1, 2, 3, 4, 5 and corresponds to each rib 26, 31–35, respectively, with the leading edge solidity 26 being defined as the zero (0) rib so that for the leading edge solidity 26, t=0, for rib 31, t=1, for rib 32, t=2 and so forth; A and x are empirically derived coefficients; e is a natural logarithmic function; and D is the distance from the leading edge 12 to the $t^{th}$ rib.

The value of the coefficients A and x can be empirically derived for each particular engine application by determining an optimal location for the first spanwise rib 31, t=1, and by establishing an end point 50 for the leading edge solidity 26. The value of the coefficient A is set equal to the distance from the leading edge 12 to the end 50 of the leading edge solidity 26 measured at approximately eighty percent (80%) of the radial span from the bottom 16. The distance to the first rib 31, t=1, is determined by trial and error. Once the location of the first rib 31 is established, the equation can be solved for the coefficient x with x=(ln (D/A))/t. Once the coefficients A and x are derived, the location of the subsequent ribs 32–35 can be determined by solving the equation for D, the distance from the leading edge 12 to the rib t. The distance, D, is measured from the leading edge 12 to approximately the centerline of each rib 31–35 at approximately eighty percent (80%) of the radial span from the bottom 16.

Figure 3:
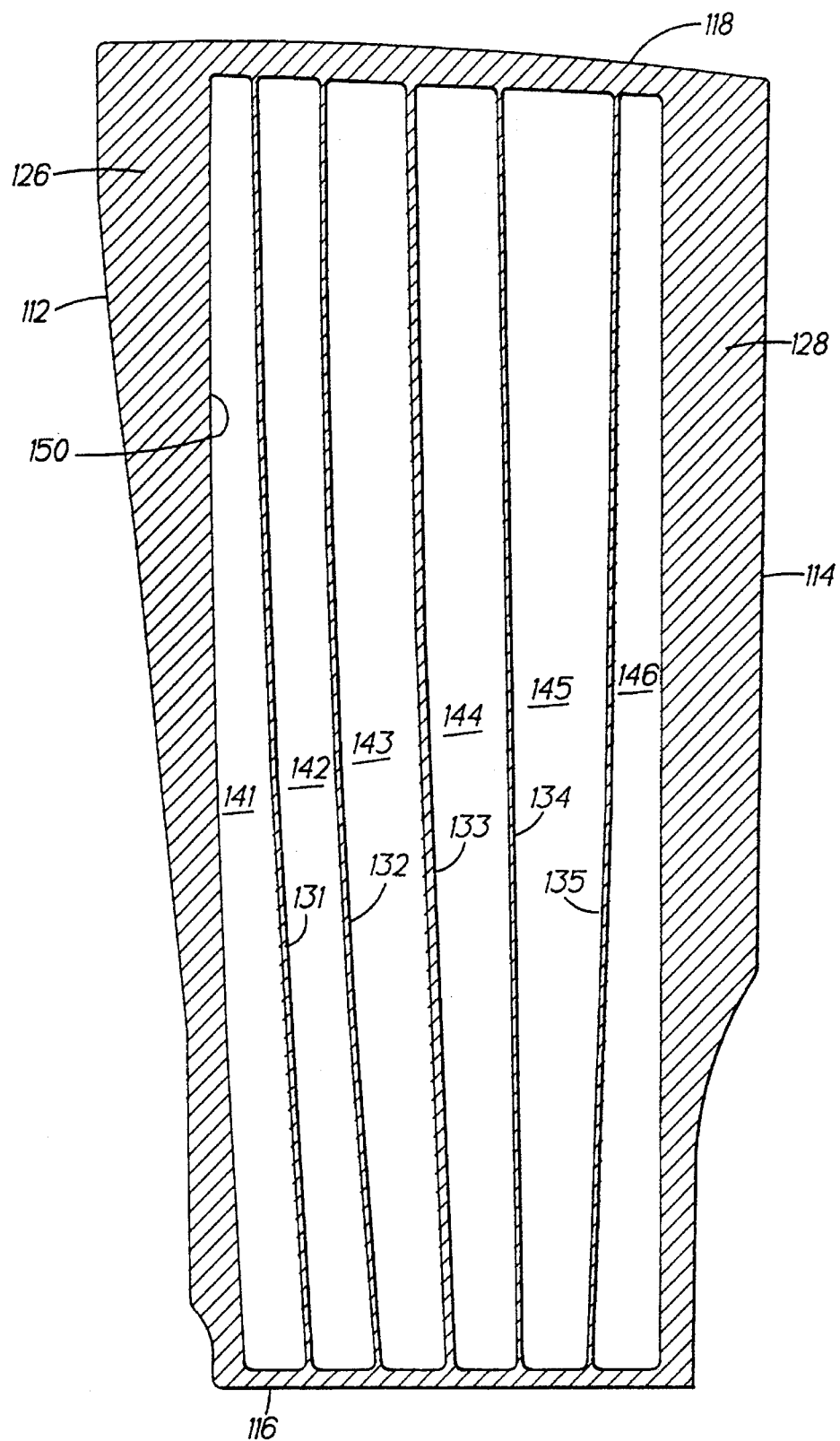
FIG. 3 is a view of one half a blade with slightly bent internal stiffening ribs having uniform spacing in the bottom portion and logarithmic spacing in the upper portion of the blade, showing another embodiment of the present invention.

The impact occurs at the leading edge of each airfoil. The impact critical zone of the airfoil is defined as sixty percent (60%) to one hundred percent (100%) radial span from the bottom 16 to the top 18 and zero percent (0%) to sixty percent (60%) chordwise span from the leading edge 12. The impact shock wave decays logarithmically as it travels from the impact point at the leading edge 12 towards the trailing edge 14. The ribs disposed within the impact critical zone are spaced closer together. The spacing between the spanwise ribs increases logarithmically as the distance from the leading edge 12 increases. The logarithmic spacing of the spanwise ribs within the impact critical zone provides sufficient stiffness for the airfoil to withstand even the most severe impact. The spacing between the ribs within the trailing edge 14 does not have to be logarithmic because the trailing edge is outside of the impact critical zone. Cavity 46 does not adhere to the logarithmic pattern and can be fabricated of any size. The spacing between the ribs 31–35 from the bottom 16 to approximately sixty percent (60%) of the radial span is not critical from the impact resistance standpoint and can be logarithmic, uniform or have any other pattern, since the impact critical zone occurs sixty percent (60%) to one hundred percent (100%) radial span of the airfoil. FIG. 3 depicts internal ribs 131–135 having uniform spacing in the bottom sixty percent (60%) of the radial span and logarithmic spacing within the sixty to one hundred percent (60–100%) of the radial span.

Figure 4:
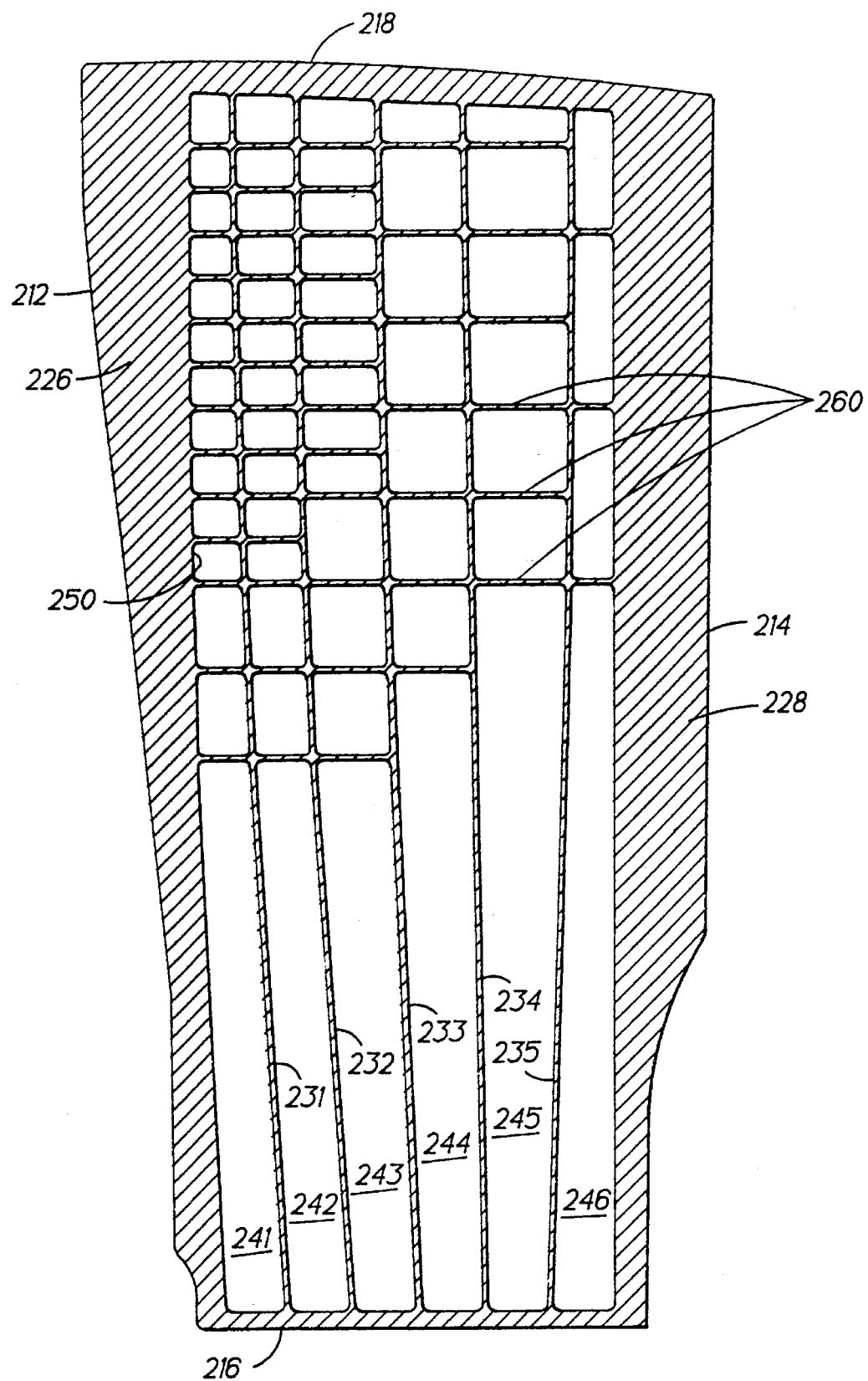
FIG. 4 is a view of one half a blade with internal spanwise stiffening ribs and chordwise ribs, showing a further embodiment of the present invention.
Figure 5:
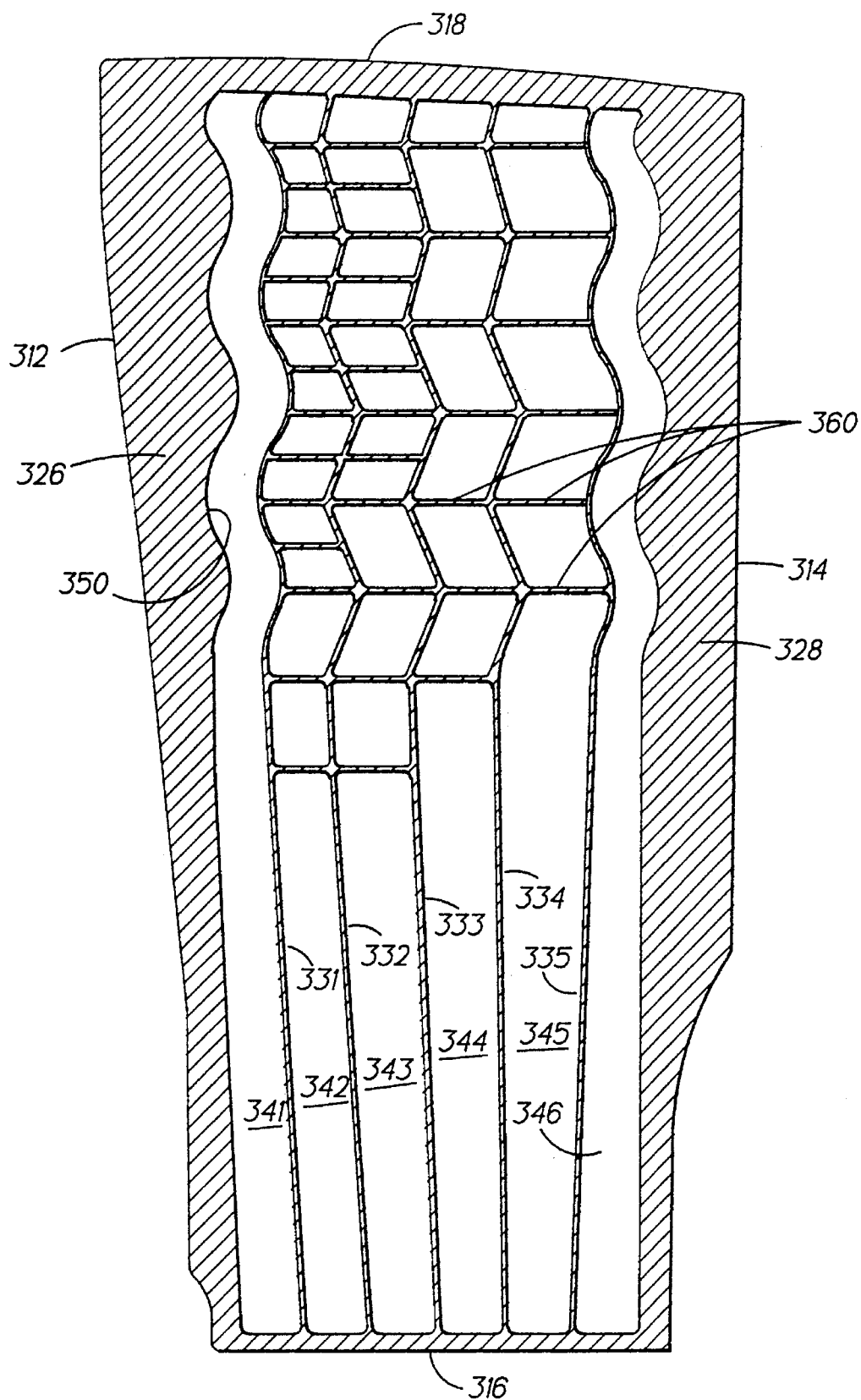
FIG. 5 is a view of one half a blade with internal spanwise stiffening ribs having curvilinear shape and chordwise ribs, showing a further embodiment of the present invention.

Referring to FIG. 4, another embodiment of the present invention includes a plurality of spanwise ribs 231–235 arranged in a logarithmic pattern and a plurality of chordwise ribs 260 intersecting with the spanwise ribs. The logarithmic arrangement can be implemented even when the chordwise ribs are included. Furthermore, the spanwise ribs can be fabricated substantially straight, as shown in FIG. 1, or have a curvilinear shape, as shown in FIGS. 3–5. The shape of the internal ribs depends on fabrication requirements and other specific needs of the particular engine.

The logarithmic arrangement of the internal spanwise ribs 31–35 within the hollow airfoils provides optimum stiffness for the airfoils so that the airfoils are not damaged from the impact caused by the foreign objects ingested by the gas turbine engine. The logarithmic arrangement provides a gradual transition between the leading edge solidity and the hollow sections, thereby minimizing the stiffness discontinuity in the airfoils. The optimum stiffness is obtained while the overall weight of these airfoils is minimized.

In the discussion above, the location of the first rib 31 was established by trail and error. It is possible to determine location of any other rib by either trial and error or by any other constraints placed on the design of the airfoil and to derive the location of the first rib by applying the formula.

Although the invention has been shown and described with respect to exemplary embodiments thereof, it should be understood by those skilled in the art that various changes, omissions, and additions may be made thereto, without departing from the spirit and scope of the invention. For example, the preferred embodiment described above discloses a logarithmic relationship for the internal rib arrangement based on natural logarithm. The logarithmic arrangement of the internal ribs can be also expressed in terms of the common logarithms, also known as base ten logarithms, as:

$$D = A \, 10^{yt}$$

wherein t=0, 1, 2, 3, 4, 5 and corresponds to each rib 26, 31–35, respectively, with the leading edge solidity 26 being defined as the zero (0) rib; A and y are empirically derived coefficients; and D is the distance from the leading edge 12 to the $t^{th}$ rib. The value for the empirically derived coefficient A will remain the same, whereas the value for the empirically derived coefficient y will be different.

Furthermore, since the chordwise width of each rib 31–35 is relatively small (approximately 0.06–0.08 inches), it is not essential to measure the distance D from the leading edge to the centerline of each rib. The distance D can be measured from the leading edge 12 to any point on each rib 31–35.

We claim:

1. A hollow blade for a gas turbine engine, said blade having a leading edge and a trailing edge extending radially spanwise from a bottom portion to a top portion of said blade, said blade having a suction side and a pressure side extending chordwise from said leading edge to said trailing edge, said blade having a leading edge solidity formed at said leading edge thereof, said hollow blade characterized by:

a plurality of internal spanwise stiffening ribs extending substantially radially spanwise and joining said pressure side with said suction side, said plurality of spanwise stiffening ribs defining a plurality of cavities therebetween, said plurality of spanwise ribs having logarithmic spacing to reduce stiffness discontinuity in said hollow blade.

2. The hollow blade according to claim 1 further characterized by:

said logarithmic spacing adhering to formula:

$$D = A e^{xt}$$

wherein t=0, 1, 2, 3 etc. and represents a sequential number of each said spanwise stiffening rib following said leading edge solidity with said leading solidity being defined as the zero rib; A and x are empirically derived coefficients; e is a natural logarithmic function; and D is the distance from said leading edge to said $t^{th}$ rib.

3. The hollow blade according to claim 2 further characterized by:

said empirically derived coefficient A being set equal to chordwise distance between said leading edge and an end of said leading edge solidity.

4. The hollow blade according to claim 3 further characterized by:

the chordwise distance between said leading edge and said end of said leading edge solidity for deriving said coefficient A being measured at approximately eighty percent (80%) of radial span from said bottom portion of said hollow blade.

5. The hollow blade according to claim 4 further characterized by:

said coefficient x being derived after location of one of said spanwise stiffening ribs was ascertained.

6. The hollow blade according to claim 1 further characterized by:

said logarithmic spacing being maintained approximately from sixty percent (60%) to one hundred percent (100%) of radial span from said bottom portion towards said top portion of said hollow blade.

7. The hollow blade according to claim 1 further characterized by:

said plurality of spanwise stiffening ribs having uniform spacing from said bottom portion of said hollow blade to approximately sixty percent (60%) of radial span thereof.

8. The hollow blade according to claim 1 further characterized by:

said logarithmic spacing being maintained within first sixty percent (60%) of chordwise span of said hollow blade.

9. The hollow blade according to claim 1 further characterized by:

a plurality of chordwise ribs extending chordwise and interconnecting with said plurality of spanwise stiffening ribs.

10. The hollow blade according to claim 1 further characterized by:

each said spanwise stiffening rib having a curvilinear shape.

11. The hollow fan blade according to claim 1 further characterized by:

said logarithmic spacing adhering to formula:

$$D=A\ 10^{yt}$$

wherein t=0, 1, 2, 3 etc. and represents a sequential number of each said spanwise stiffening rib following said leading edge solidity with said leading solidity being defined as the zero rib; A and y are empirically derived coefficients; and D is the distance from said leading edge to said $t^{th}$ rib.

12. A hollow airfoil for a gas turbine engine, said airfoil having a leading edge and a trailing edge extending radially spanwise from a bottom portion to a top portion of said airfoil, said airfoil having a suction side and a pressure side extending chordwise from said leading edge to said trailing edge, said airfoil having a leading edge solidity formed at said leading edge thereof, said hollow airfoil characterized by:

a plurality of internal spanwise stiffening ribs extending substantially radially spanwise and joining said pressure side with said suction side, said plurality of spanwise ribs being arranged in a logarithmic pattern to reduce stiffness discontinuity in said hollow airfoil, said logarithmic pattern adhering to formula:

$$D=A\ e^{xt}$$

wherein t=0, 1, 2, 3 etc. and represents a sequential number of each said spanwise stiffening rib following said leading edge solidity with said leading solidity being defined as the zero rib; A and x are empirically derived coefficients; e is a natural logarithmic function; and D is the distance from said leading edge to said $t^{th}$ rib.

13. A method for fabricating a hollow airfoil having a leading edge and a trailing edge extending radially spanwise, said airfoil having a suction side and a pressure side extending chordwise from said leading edge to said trailing edge, said airfoil having a leading edge solidity formed at said leading edge thereof, said method comprising the steps of:

determining chordwise length of said leading edge solidity;

setting an optimum spacing for a first spanwise stiffening rib extending radially spanwise and joining said pressure side with said suction side so that a first cavity is defined between said first stiffening rib and said leading edge solidity;

spacing subsequent spanwise stiffening ribs in a logarithmic pattern to reduce stiffness discontinuity in said hollow airfoil.

14. The method for fabricating a hollow airfoil according to claim 13 wherein said logarithmic pattern being expressed as:

$$D=A\ e^{xt}$$

wherein t=0, 1, 2, 3 etc. and represents a sequential number of each said spanwise stiffening rib following said leading edge solidity with said leading solidity being defined as the zero rib; A and x are empirically derived coefficients; e is a natural logarithmic function; and D is the distance from said leading edge to the $t^{th}$ rib.

15. The method for fabricating a hollow airfoil according to claim 13 wherein said logarithmic pattern being expressed as:

$$D=A\ 10^{yt}$$

wherein t=0, 1, 2, 3 etc. and represents a sequential number of each said spanwise stiffening rib following said leading edge solidity with said leading solidity being defined as the zero rib; A and y are empirically derived coefficients; and D is the distance from said leading edge to the $t^{th}$ rib.

* * * * *